(No Model.)
H. L. GILLETTE.
SCREW DRIVER.
No. 462,252. Patented Nov. 3, 1891.
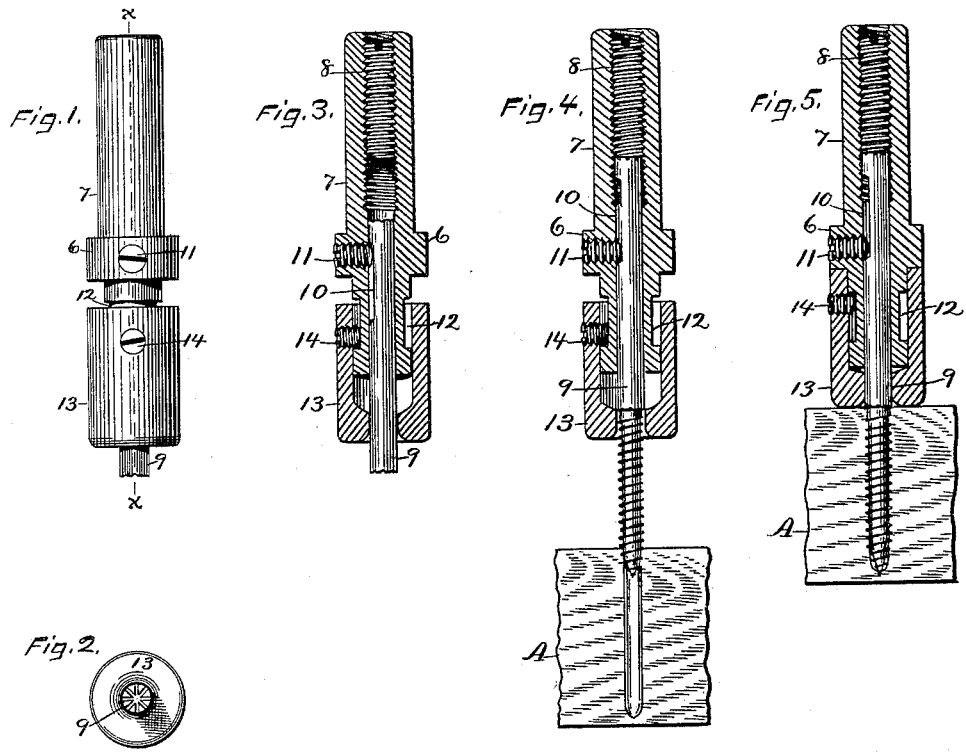
Witnesses.
John Edwards Jr.
E. V. Tracy.
Inventor.
Horace L. Gillette.
By James Shepard.
Atty.

UNITED STATES PATENT OFFICE.

HORACE L. GILLETTE, OF DAYTON, OHIO, ASSIGNOR TO THE RUSSELL & ERWIN MANUFACTURING COMPANY, OF NEW BRITAIN, CONNECTICUT.

SCREW-DRIVER.

SPECIFICATION forming part of Letters Patent No. 462,252, dated November 3, 1891.

Application filed December 8, 1890. Serial No. 373,874. (No model.)

*To all whom it may concern:*

Be it known that I, HORACE L. GILLETTE, a citizen of the United States, residing at Dayton, in the county of Montgomery and State of Ohio, have invented certain new and useful Improvements in Screw-Drivers, of which the following is a specification.

My invention relates to improvements in screw-drivers; and the objects of my improvement are to furnish a proper driver for driving felly-screws or analogous screws which have little or no head, and to make the driver adjustable for driving such screws into the wood a greater or less distance relative to the surface of the wood.

In the accompanying drawings, Figure 1 is a side elevation of my screw-driver. Fig. 2 is a reverse plan view of the same. Fig. 3 is a longitudinal section of the same on line $xx$ of Fig. 1, the central members being shown in side elevation. Fig. 4 is a like view, together with a screw and piece of wood, the same illustrating the position of the parts when the screw is being driven into the wood; and Fig. 5 is a like view of the same, illustrating the position of the parts as they appear when the screw is fully driven into the wood.

6 designates the driver-head, having a shank 7, by which to secure it in a drill-lathe spindle or within any tool stock or chuck. When the tool is to be driven with the hand, this shank may be attached to or made in the form of a suitable handle. Ordinarily the driver will be driven by power. The entire head, shank, and all are bored axially, and the upper end of the hole threaded for the reception of the adjusting-screw 8. The hole or bore at the lower end of the head is for the reception of the driver 9. As shown, I have made this driver of a round form, with a portion slabbed off to form a flat face, as at 10, said flat face not extending quite to the upper end of the driver, so that it has a shoulder at its upper end. A set-screw 11 extends through the head with its end opposite said flat face, so as to prevent said driver from rotating within the head and to engage the shoulder at the upper end of said flat face and prevent the driver from dropping out, as shown in Fig. 3. I prefer to groove, serrate, or roughen the lower end of the driver, as shown, so as to give it a better hold upon the screw. The lower end of the head is provided with an annular groove 12, and upon this grooved portion I arrange a sliding tubular guide 13, the same being held in place by a set-screw 14, whose end enters the annular groove, and when the guide is dropped down, as shown in Figs. 1, 3, and 4, said screw comes in contact with the shoulder at the lower side of said annular groove and prevents the sliding tubular guide from dropping off the head. The lower end of this sliding tubular guide has a hole or socket of a size that will freely admit and nearly fit the head end of the screw that is to be driven by it, and it is rounded on the mouth or lower end to facilitate the entry of the screw. When the tool is idle, the driver and guide hang down, as shown in Figs. 1 and 3. A piece of wood A, previously bored to receive a screw, is placed upon the slide of the drilling-machine and a screw-tip inserted in said hole. The slide with the work upon it is then raised, (or the lathe-spindle and driver brought down,) so that the upper end of the screw is brought against the lower end of the driver, thereby pushing it upwardly until it is stopped by contact with the lower edge of the adjusting-screw 8, thereby raising the lower end of the driver above the lower end of the guide 13, so that said guide incloses the upper end of the screw while the driver is pressing upon said upper end, all as illustrated in Fig. 4. Thus the guide prevents the driver from slipping off the screw, while the pressure of the end of the driver on the end of the screw is sufficient to make the screw revolve with the driver and screw it into the wood. When the screw has entered nearly its whole depth, the lower end of the guide 13 comes in contact with the upper surface of the wood, and is pushed upwardly thereby until the screw is screwed into the wood the desired distance, the annular groove 12 on the head being wide enough to permit the guide to thus slide upwardly, all as shown in Fig. 5. As illustrated, the driver is adjusted so as to leave the end of the screw flush with the surface of the wood. By turning the adjusting-screw 8 so as to screw it in or out, the driver may be adjusted to sink the upper end of the screw a little below the surface of the wood, or to leave it slightly projecting therefrom.

While I have illustrated my driver as toothed or grooved at its ends, it may be made plain, if desired, or otherwise shaped for giving a good hold upon the screw—as, for instance, making its end slightly conical or convex in connection with the upper end of screws made of a form to fit the same. Such matters may be regulated by the skill of a mechanic as may be desired. Even when the driver slides it is not necessary to make it adjustable, as it would work the same, as hereinbefore described, for a given piece of work if, instead of the adjusting-screw 8, the axial portion of the shank were solid for a distance corresponding to the length of said screw.

I have, for convenience, illustrated the screws 11 and 14 as in one plane; but in fact the sliding tubular guide is free to rotate on the head, so that its screw 14 may or may not be directly under the screw 11.

By my improved driver felly-screws may be readily driven into the wood to any desired depth, and the driver is prevented from slipping off the end of the screw during the driving operation.

I claim as my invention—

1. The combination of the screw-driver 9, the driver-head 6, through which power is applied, means for preventing said driver from rotating within said head, said driver and head being arranged to slide longitudinally relatively to each other, means for limiting the longitudinal sliding movement of said driver and head, the sliding tubular guide 13, and means for limiting the longitudinal movement of said guide on said head, substantially as described, and for the purpose specified.

2. The combination of the head 6, the sliding screw-driver 9, a guide for surrounding the lower end of said driver, and the adjusting-screw for adjusting the position of the driver with reference to the end of said guide, substantially as described, and for the purpose specified.

HORACE L. GILLETTE.

Witnesses:
H. R. FULLER,
R. E. GERKINS.